(12) United States Patent
Kwong

(10) Patent No.: US 9,609,262 B2
(45) Date of Patent: Mar. 28, 2017

(54) DEVICE FOR ADAPTIVE PROJECTION

(71) Applicant: Intel Corporation, Santa Clara, CA (US)

(72) Inventor: Wah Yiu Kwong, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 311 days.

(21) Appl. No.: 14/126,794

(22) PCT Filed: Jun. 27, 2013

(86) PCT No.: PCT/US2013/048314
§ 371 (c)(1),
(2) Date: Dec. 16, 2013

(87) PCT Pub. No.: WO2014/209328
PCT Pub. Date: Dec. 31, 2014

(65) Prior Publication Data
US 2015/0222842 A1    Aug. 6, 2015

(51) Int. Cl.
*H04N 3/22*    (2006.01)
*H04N 5/74*    (2006.01)
(Continued)

(52) U.S. Cl.
CPC ............. *H04N 5/74* (2013.01); *G03B 17/54* (2013.01); *G06F 3/01* (2013.01); *H04N 9/3182* (2013.01);
(Continued)

(58) Field of Classification Search
CPC .... H04N 9/314; H04N 9/3197; H04N 9/3173; H04N 9/3179; H04M 1/0272; G06F 1/1639; G06F 1/1616; G06F 1/1649
(Continued)

(56) References Cited

U.S. PATENT DOCUMENTS

2004/0142103 A1    7/2004  Belliveau et al.
2008/0018591 A1*   1/2008  Pittel et al. ................... 345/156
(Continued)

OTHER PUBLICATIONS

International Search Report and Written Opinion for International Application No. PCT/US2013/048314, mailed Mar. 21, 2014, whole document.
(Continued)

*Primary Examiner* — Michael Lee
(74) *Attorney, Agent, or Firm* — Blakely, Sokoloff, Taylor & Zafman LLP

(57) ABSTRACT

Embodiments of the invention describe apparatuses, systems and methods for dynamic projector calibration. Embodiments of the invention execute operations for capturing, via an image sensor included in a projector device, image data of an area around the projector device. Said image sensor captures 3D distance information as well as image pixel information of the surrounding area. A projection area is selected based (in part) on surface properties of the projection area determined from the image data.

The projector may be calibrated (e.g., projection brightness, color balance, angle, etc.) based on the captured image data. A user I/O interface is projected onto the selected projection area, and the projector may be further (i.e., dynamically) calibrated based on captured image data of the projected user I/O interface.

18 Claims, 6 Drawing Sheets

(51) Int. Cl.
  *G03B 17/54* (2006.01)
  *G06F 3/01* (2006.01)
  *H04N 9/31* (2006.01)

(52) U.S. Cl.
  CPC ......... *H04N 9/3185* (2013.01); *H04N 9/3194* (2013.01)

(58) Field of Classification Search
  USPC ........................................................ 348/745
  See application file for complete search history.

(56) References Cited

U.S. PATENT DOCUMENTS

| | | | |
|---|---|---|---|
| 2008/0028325 A1* | 1/2008 | Ferren | G06F 3/017 715/753 |
| 2008/0100805 A1* | 5/2008 | Majumder et al. | 353/30 |
| 2009/0059182 A1* | 3/2009 | Ha et al. | 353/69 |
| 2009/0115721 A1* | 5/2009 | Aull | G06F 3/017 345/156 |
| 2009/0116742 A1* | 5/2009 | Nishihara | G06F 3/0425 382/173 |
| 2010/0060803 A1 | 3/2010 | Slack et al. | |
| 2010/0079468 A1* | 4/2010 | Pance et al. | 345/501 |
| 2010/0079653 A1* | 4/2010 | Pance | 348/333.1 |
| 2011/0075055 A1* | 3/2011 | Bilbrey | 348/744 |
| 2011/0149094 A1* | 6/2011 | Chen et al. | 348/208.3 |
| 2011/0164226 A1 | 7/2011 | Wu et al. | |
| 2011/0243380 A1* | 10/2011 | Forutanpour et al. | 382/103 |
| 2012/0038592 A1 | 2/2012 | Shyu et al. | |

OTHER PUBLICATIONS

International Preliminary Report on Patentability mailed Jan. 7, 2016, in International Patent Application No. PCT/US2013/048314, 11 pages.

\* cited by examiner

DEVICE FOR ADAPTIVE PROJECTION

CROSS-REFERENCE TO RELATED APPLICATION

This application is a U.S. National Phase application under 35 U.S.C. §371 of International Application No. PCT/US2013/048314, filed Jun. 27, 2013, entitled "DEVICE FOR ADAPTIVE PROJECTION," the entire contents of which are incorporated herein by reference.

FIELD

Embodiments of the present invention generally pertain to computing devices and more specifically to computer projection devices.

BACKGROUND

Current projection devices are typically designed for a specific projection surface and projection angle, and are not configurable for a wide range of settings. For example, most projectors are designed to project onto a surface having a neutral tone (e.g., white) with minimal texture or reflectiveness; deviation from these surface properties reduces projector performance. Furthermore, if a projector's position deviates from its intended projection angle (e.g., perpendicular to the target projection surface), the projected image may be distorted until a user physically adjusts the physical position of the projector by moving it around, tilting and rotating it until a non-distorted image is displayed.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Descriptions of certain details and implementations follow, including a description of the figures, which may depict some or all of the embodiments described below, as well as a discussion of other potential embodiments or implementations of the inventive concepts presented herein. An overview of embodiments of the invention is provided below, followed by a more detailed description with reference to the drawings.

DETAILED DESCRIPTION

Embodiments of the invention describe projection devices capable of dynamic calibration. Throughout this specification, several terms of art are used. These terms are to take on their ordinary meaning in the art from which they come, unless specifically defined herein or the context of their use would clearly suggest otherwise. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Figure 1:
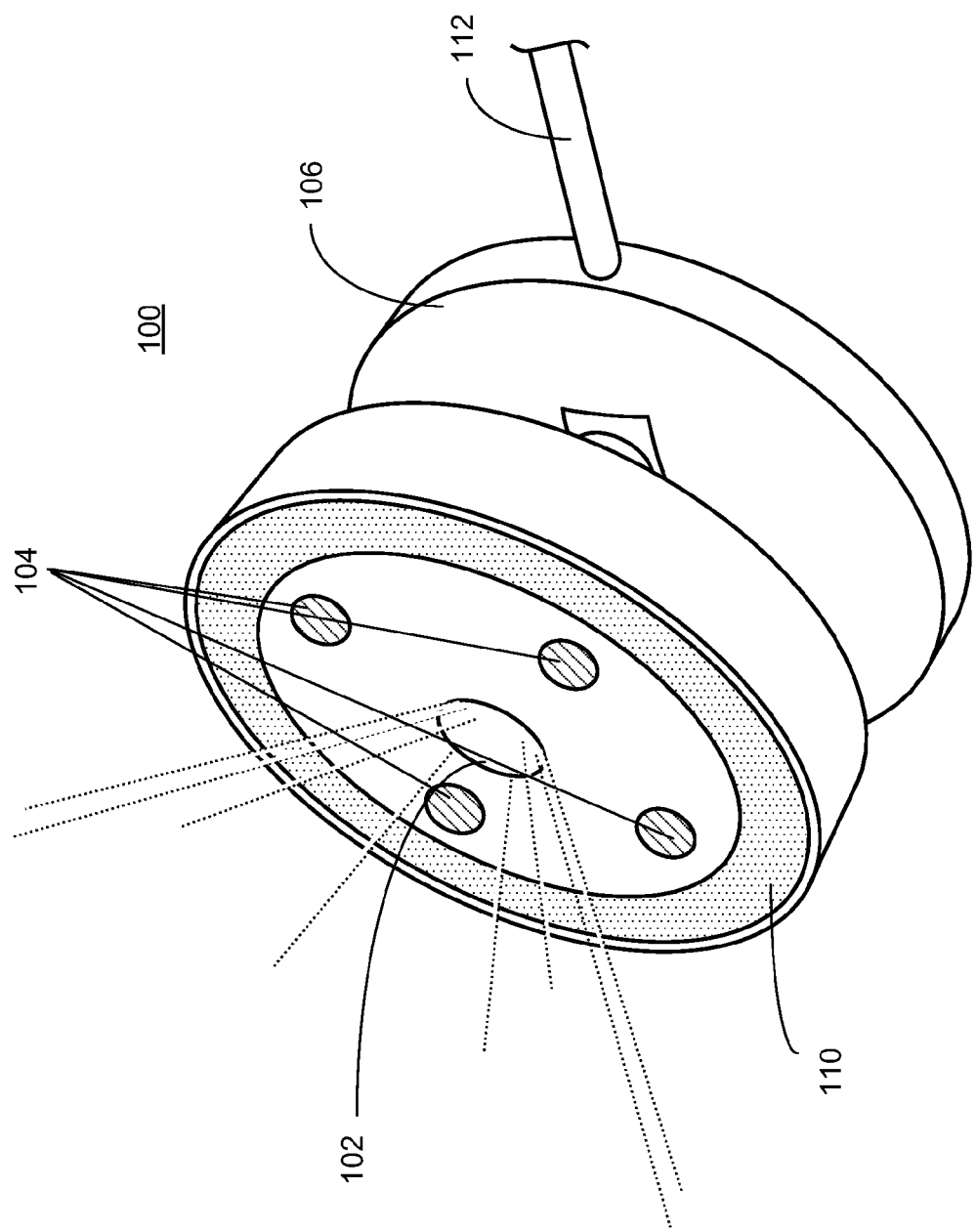
FIG. 1 is an illustration of a projector device according to an embodiment of the invention.

FIG. 1 is an illustration of a projector device according to an embodiment of the invention. In this embodiment, device 100 includes projector 102 which may comprise, for example, a high definition (HD) nano-projector or pico projector, or any functionally equivalent projector device. As described below, projector 102 is used to project image data (e.g., a video display, a user input/output (I/O) display) onto a projection area near the device. Device 100 is shown to also include camera 104, which may comprise, for example, a three-dimensional (3D) depth sensing camera, or any functionally equivalent camera that is capable of obtaining distance information as well as image pixel information.

In this embodiment, device 100 is shown to be mountable via mounting bracket 106. In other embodiments, a projector device may be coupled to a free-standing base, or use other means to affix itself onto any surface (e.g., suction cup for mounting onto a flat surface, a clip to couple to a user as a user-wearable projector device, etc.).

Device 100 is shown to include audio speakers 110 and power/data cord 112. The device may also include other components not illustrates, such as connectivity logic, which may comprise multiple different types of connectivity, such as cellular or wireless connectivity, a processor, and an audio sensor (e.g., a microphone).

Camera 104 may capture image data of an area around device 100, wherein said image data may comprise obtaining distance information as well as image pixel information. Processing logic may execute an image analysis process to select a projection surface and area based, at least in part, on surface properties of the projection area determined from the image data of the area around the projector device; said processing logic may be executed via an included processor, or may be executed by another computer (i.e., backend processing) that is communicatively coupled to device 100 via connectivity logic or power/data cord 112.

Projector 102 projects image data such as a user I/O display (similar to a touch screen, as described below) onto the projection area around device 100, and calibrates the projection based on the determined surface properties (e.g., color of the surface, texture of the surface, etc.). Audio speakers 110 may present audio data to the user that is related to the projected image data. Camera 104 may then capture image data of user gestures within a viewable frame of the I/O display (i.e., above, on top of and/or in front of the I/O display) via the image sensor included in the computing device, so that these gestures may be processed as user I/O commands. Additional commands may be received via an audio sensor.

In this embodiment, projector 102 and camera 104 are shown to be included in the same housing (in this embodiment, projector 102 and camera 104 are shown to utilize the same lens). Thus, the projected display of projector 102 is capable of being routinely or continuously monitored by camera 104 so that it may be dynamically calibrated. For example, camera 104 (or alternatively, a separate ambient light sensor (ALS)) may capture data identifying an ambient light level for the projection area, and projector 102 may be configured to adjust the brightness of the projected display based on the ambient light level. Camera 104 may also detect, for example, whether the surface area has changed (e.g., the user places an object on a tabletop, reducing the potential projectable area of the surface), whether the user has moved such that the orientation of the projected display is to be changed, etc.

Figure 2:
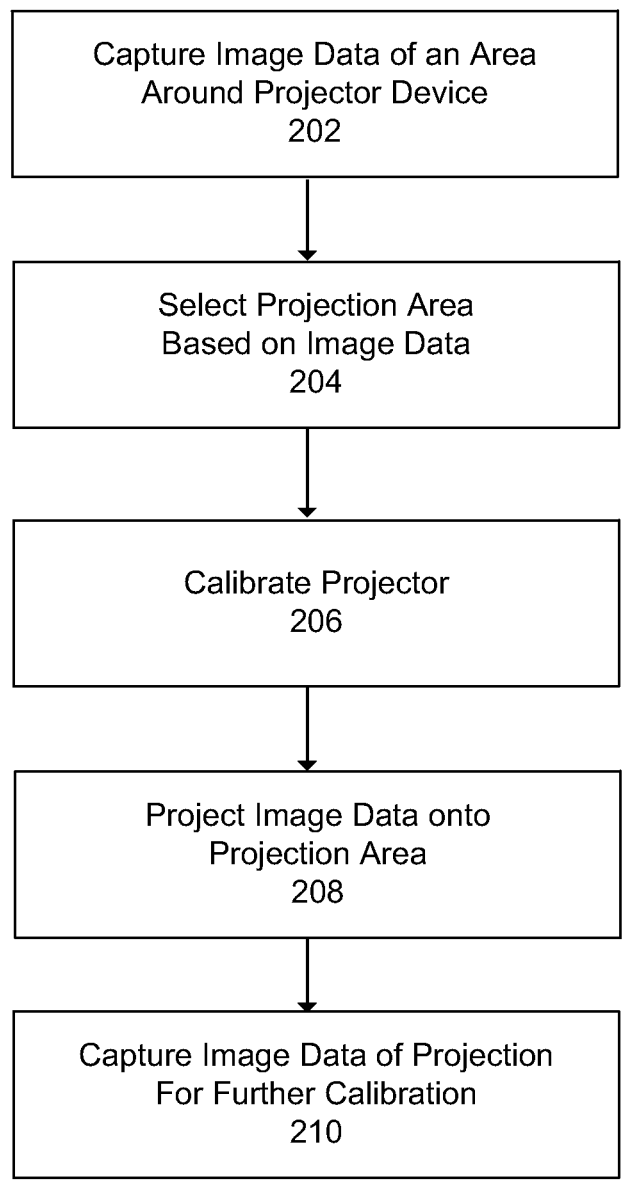
FIG. 2 is a flow diagram illustrating a process for dynamic projector calibration according to an embodiment of the invention.

FIG. 2 is a flow diagram illustrating a process for dynamic projector calibration according to an embodiment of the invention. Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the invention; thus, not all actions are required in every implementation. Other process flows are possible.

Process 200 includes operations for capturing, via an image sensor included in a projector device, image data of an area around the projector device, 202. Said image sensor captures 3D distance information as well as image pixel information of the surrounding area. A projection area is selected based, at least in part, on surface properties of the projection area determined from the image data, 204. Other factors that may determine the selected projection area include size of a potential projection area, proximity to a user, proximity to the device, etc.

The projector may be calibrated based on the captured image data, 206. For example, said captured image data may configure a projection brightness based on a detected ambient light level, a projection color balance based on the color of the target surface, a projection angle based on an incline angle of projector with respect to the target surface, the planarity/non-planarity of the target surface etc.

For example, embodiments of the invention may measure the projection area for color data of the surface, and optionally measure other lighting conditions that may affect the projected image, such as the current ambient light brightness, color temperature, etc. The projector calibration module/logic may use this data so that the projected image matches a standard color setting (e.g., Pantone color standard) or a user-defined color setting; aspects of the projected image may be adjusted, such as adjustments to color depth, brightness, contrast, hue color settings, etc.

Image data is projected onto the selected projection area, 208. Said image data may comprise viewable image data including a user I/O interface to recognize touch-based user gestures, as described below. Image data of the user I/O interface is captured, 210, for further projector calibration (as described below). The image sensor may also capture image data to detect changes to the light conditions, or if the user moves the projector device such that a different target surface having different surface properties is selected. This image data capture may be done periodically, or may be executed based on a triggering event (e.g., detecting the user moved the projector device). Thus, the projector may be re-adjusted/recalibrated based on further image data capture so that the projected image to matches the above described color setting. Said image data of the user I/O interface may also include captured user gestures, which may then be processed as user I/O commands.

Figure 3:
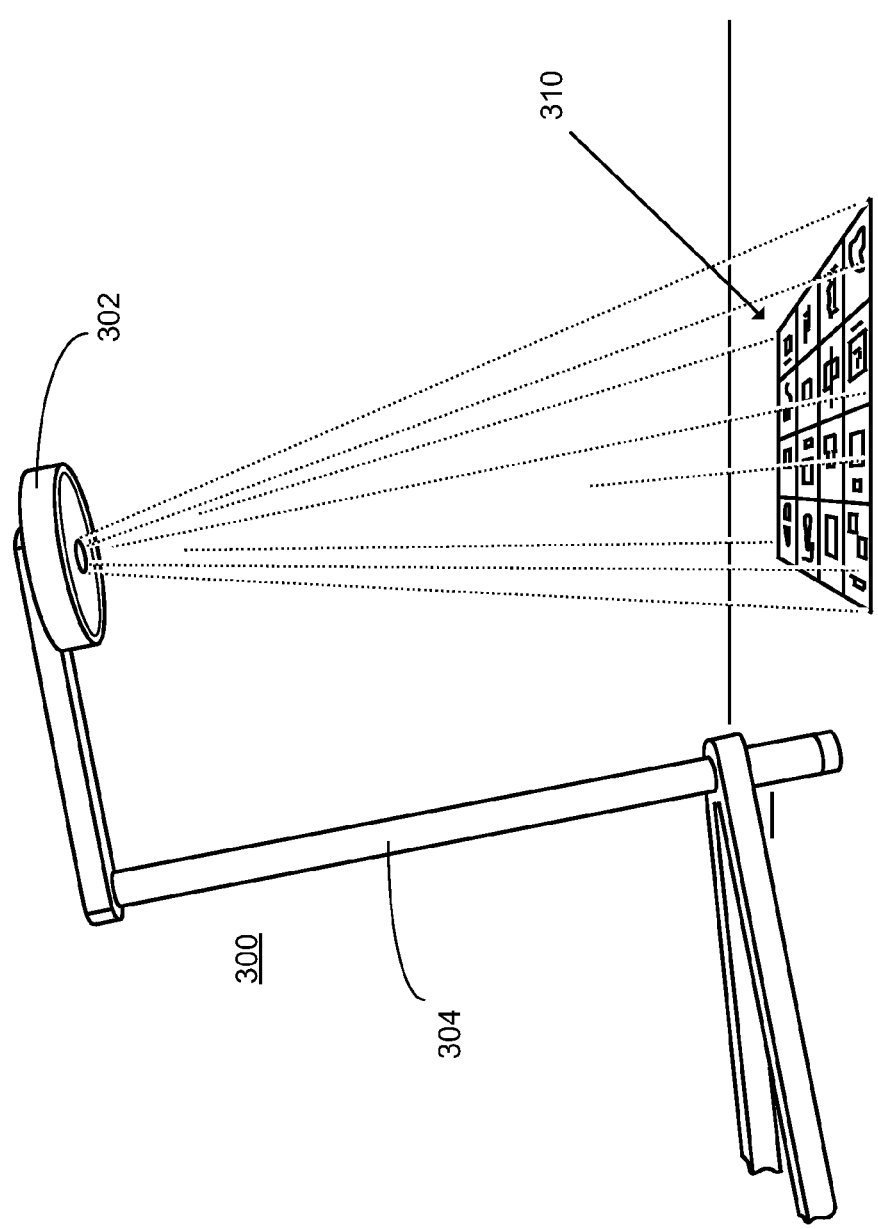
FIG. 3 is an illustration of a free-standing projector device according an embodiment of the invention.

FIG. 3 is an illustration of a free-standing projector device according an embodiment of the invention. In this embodiment, projector device 300 is shown to include projector/camera module 302 mounted onto stand 304. Projector device 300 may also include any combination of the components discussed above but not shown in this illustration (e.g., speakers, microphone, processor, etc.).

User I/O display 310 is shown to be projected onto surface 320. In this example, the brightness of the projected display is shown to be reduced, due to the low ambient light surrounding the target area. If ambient light conditions were to change, the brightness of the display may also change to maintain optical viewing conditions for the user (in some embodiments, the user may manually control aspects of the projected display via an audio command or gesture within a viewable frame of the user I/O display).

Changes to the light conditions or to surface 320 may also result in the calibration module adjusting the brightness of the display. For example, a projector calibration module may dynamically adjust projector 302 so that the projection of user I/O display 310 brightens/dims according to a predefined or user defined optimum brightness setting by adjusting a contrast parameter value, a gamma parameter value, a visible light parameter value (i.e., lumens value), and/or a visibility-specific brightness parameter value of the projector.

Embodiments of the invention may support user gestures for interacting with the projected surface, such as icons, graphics, etc. In other words, projected display 310 may present the user with the same functionality as a touch-screen interface. Recognizing touch-based events typically utilizes some method for detecting when the user's hand contacts the surface. A 3D depth sensing camera may be used to determine when the user's finger is near a target in the camera's view, and when the user's finger comes contacts the projected display (i.e., when the depth of the user's finger with respect to camera module 302 is aligned with the depth of projected display 310 with respect to the camera module).

Other examples of user gestures that may be detected by camera module 302 include dragging gestures, which begin by tapping the projection surface followed by dragging two or more fingers across the surface, or flicking gestures, which involve a user rapidly moving his finger across the surface in some direction These example gestures allow 'draggable/flickable' projected objects to follow the user's hand. Dragging/flicking actions by a user may be used, for example, to detect and process sketching/handwriting by the user within a viewable frame of the smart space.

In this example, projector/camera 302 is shown to be horizontally offset with respect to projected image data 310. Prior art projectors are typically designed so that level undistorted images are projected on a target surface when the projector's optical axis is aligned with the target surface. In the presence of misalignment, the resulting image on the projection surface may not be rectangular but instead trapezoidal, or at worst, arbitrary quadrilateral (referred to herein as keystoning). In this embodiment, projector/camera 302 is capable of capturing image data of projected image 310, and dynamically calibrating the projector to eliminate any possible keystoning due to the alignment of the projector with the target surface.

Figure 4:
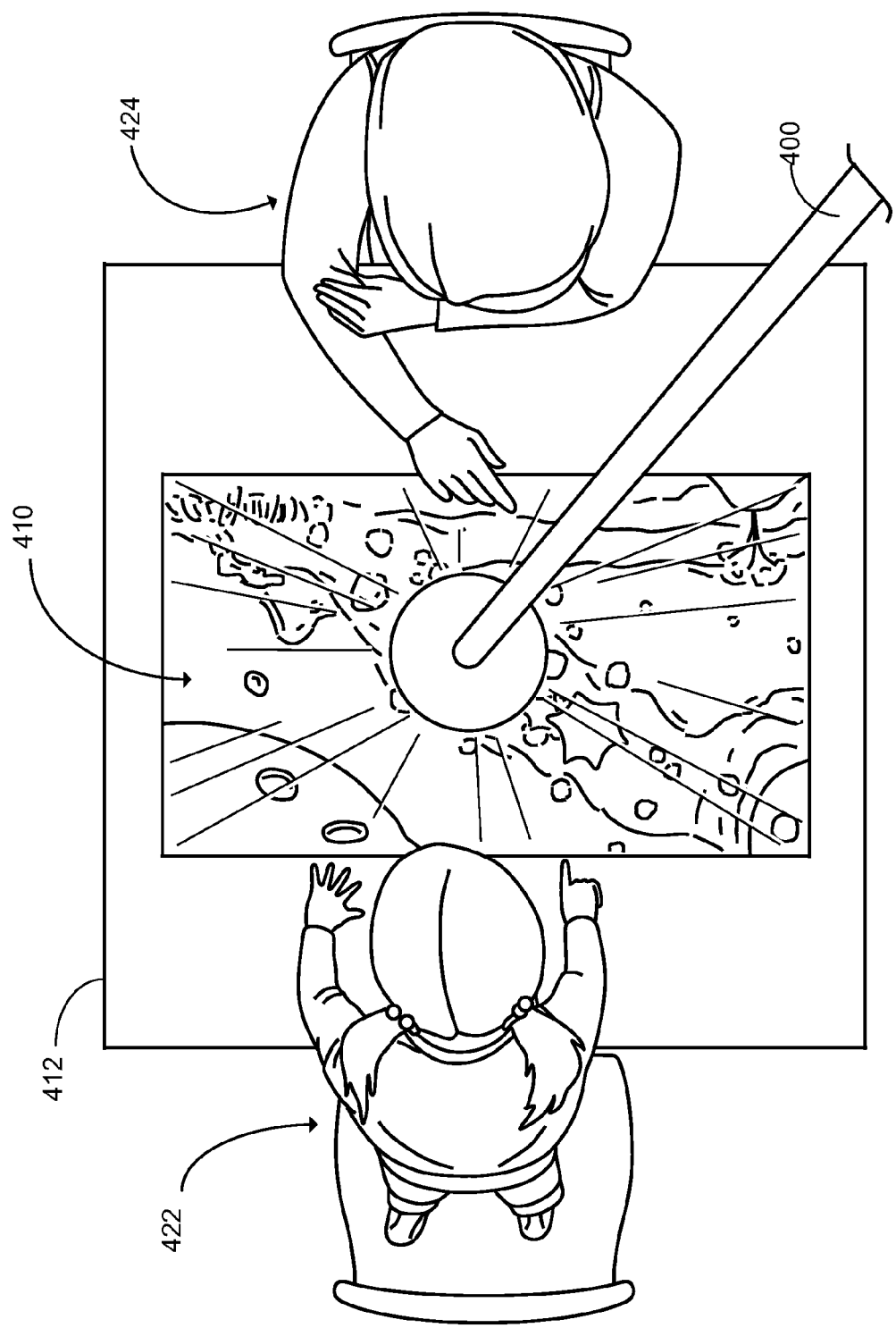
FIG. 4 is an illustration of a projected user I/O display to support multiple users according to an embodiment of the invention.

FIG. 4 is an illustration of a projected user I/O display to support multiple users according to an embodiment of the invention. In this embodiment, integrated camera/projector device 400 is shown to project user I/O display 410 onto tabletop 412 for users 420 and 422. In this example, projected user I/O display 410 is shown to be orientated for user 420.

Captured image data may be analyzed to detect multiple users, and to detect and identify gestures from both users—i.e., separately identify each user's respective gestures. The orientation of said projection remain with user 420, or may switch to user 422 in response to a voice or gesture command.

Figure 5:
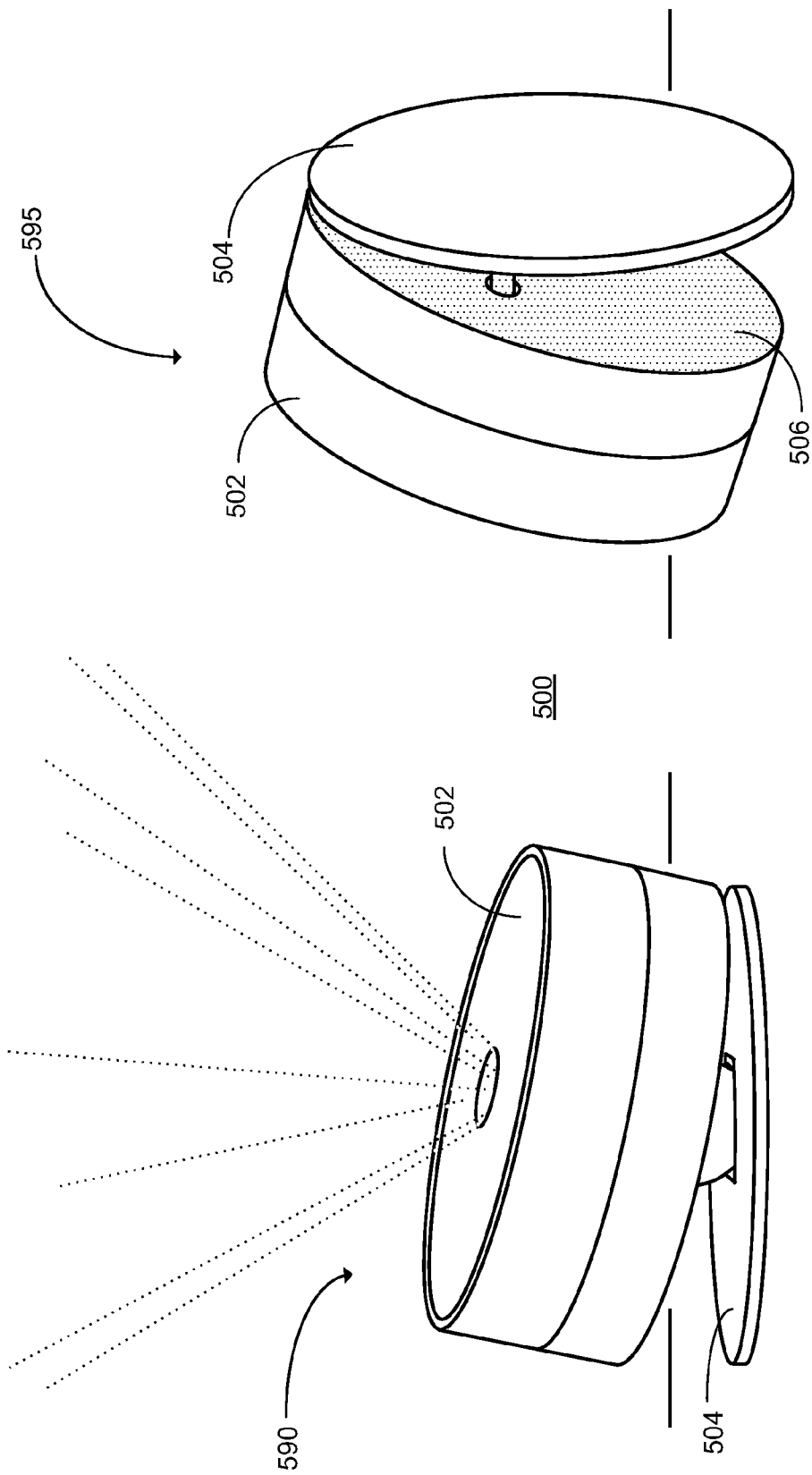
FIG. 5 is an illustration of a free-standing projector device with an integrated stand according to an embodiment of the invention.

FIG. 5 is an illustration of a free-standing projector device with an integrated stand according to an embodiment of the invention. In this embodiment, projector/camera device 500 is shown to include camera/projector module 502, integrated stand 504 and audio speaker 506. In this embodiment, integrated stand 504 is shown to allow device 500 to project onto a variety of surfaces, such as a ceiling when device is place in position 590, or a vertical flat surface such as a wall when placed in position 595.

Embodiments of the invention may dynamically detect the target surface and adjust the projection for optimum user viewing. This allows a user to dynamically move device 500 and adjusts projection on the fly. While shown to be an integrated stand, other embodiments without such a stand still allow for a user to move the device and dynamically point the projector to different surfaces.

Figure 6:
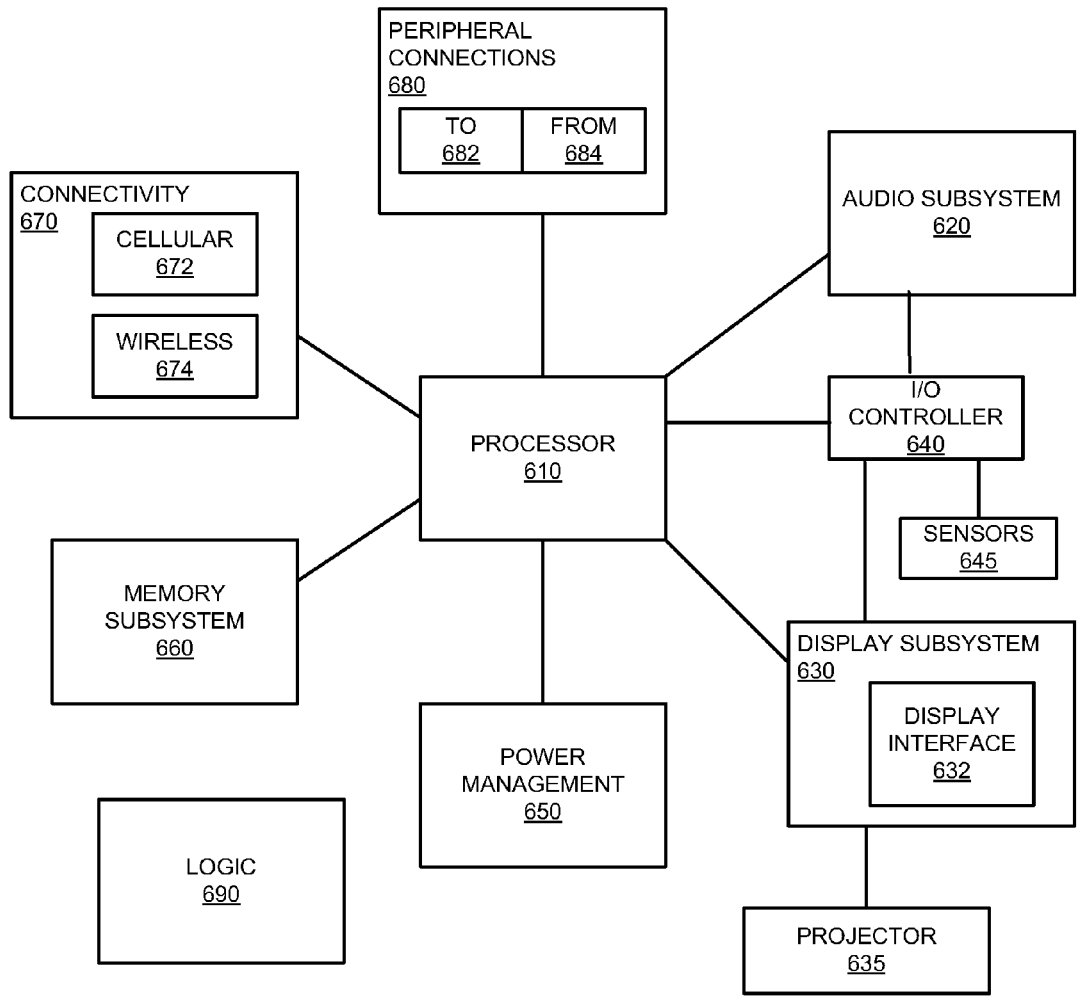
FIG. 6 is a block diagram of computing components to support dynamic projection according to an embodiment of the invention.

FIG. 6 is a block diagram of computing components to support dynamic projection according to an embodiment of the invention. Any combination of the components of computing device 600 may be included in an integrated projector/camera module as discussed above, or may be included in a computing device communicatively coupled to a projector/camera module to execute "backend processing;" thus, computing device 600 may represent a mobile computing device, such as a computing tablet, a mobile phone or smartphone, a wireless-enabled e-reader, or other wireless mobile device. It will be understood that certain of the components are shown generally, and not all components of such a device are shown in device 600.

Device 600 includes processor 610, which performs the primary processing operations of device 600. Processor 610 can include one or more physical devices, such as microprocessors, application processors, microcontrollers, programmable logic devices, processor cores, or other processing means. The processing operations performed by processor 610 include the execution of an operating platform or operating system on which applications and/or device functions are executed. The processing operations include operations related to I/O (input/output) with a human user or with other devices, operations related to power management, and/or operations related to connecting device 600 to another device. The processing operations may also include operations related to audio I/O and/or display I/O.

In one embodiment, device 600 includes audio subsystem 620, which represents hardware (e.g., audio hardware and audio circuits) and software (e.g., drivers, codecs) components associated with providing audio functions to the computing device. Audio functions can include speaker and/or headphone output, as well as microphone input via any of the audio jacks described above. Devices for such functions can be integrated into device 600, or connected to device 600. In one embodiment, a user interacts with device 600 by providing audio commands that are received and processed by processor 610.

Display subsystem 630 represents hardware (e.g., display devices) and software (e.g., drivers) components that provide a visual and/or tactile display for a user to interact with the computing device. Display subsystem 630 includes display interface 632, which includes the particular screen or hardware device used to provide a display to a user. In one embodiment, display interface 632 includes logic separate from processor 610 to perform at least some processing related to the display. In one embodiment, display subsystem 630 includes a touchscreen device that provides both output and input to a user. In this embodiment, display subsystem 630 is shown to be communicatively coupled to projector 635; said projector is to project a user I/O display onto a projection area, the projection area selected based, at least in part, on surface properties of the projection area determined from an image data of an area around device 600.

I/O controller 640 represents hardware devices and software components related to interaction with a user. I/O controller 640 can operate to manage hardware that is part of audio subsystem 620 and/or display subsystem 630. Additionally, I/O controller 640 illustrates a connection point for additional devices that connect to device 600 through which a user might interact with the system. For example, devices that can be attached to device 600 might include microphone devices, speaker or stereo systems, video systems or other display device, keyboard or keypad devices, or other I/O devices for use with specific applications such as card readers or other devices.

As mentioned above, I/O controller 640 can interact with audio subsystem 620 and/or display subsystem 630. For example, input through a microphone or other audio device can provide input or commands for one or more applications or functions of device 600. Additionally, audio output can be provided instead of or in addition to display output. In another example, if display subsystem includes a touchscreen, the display device also acts as an input device, which can be at least partially managed by I/O controller 640. There can also be additional buttons or switches on device 600 to provide I/O functions managed by I/O controller 640. In this embodiment, I/O controller 640 is shown to be communicatively coupled sensors 645; said sensors are to capture the image data of the area around device 600, to capture image data of the projected user I/O display, and to capture image data of user gestures within a viewable frame the I/O display.

In one embodiment, I/O controller 640 manages devices such as accelerometers, cameras, light sensors or other environmental sensors, or other hardware that can be included in device 600. The input can be part of direct user interaction, as well as providing environmental input to the system to influence its operations (such as filtering for noise, adjusting displays for brightness detection, applying a flash for a camera, or other features). In one embodiment, device 600 includes power management 650 that manages battery power usage, charging of the battery, and features related to power saving operation.

Memory subsystem 660 includes memory devices for storing information in device 600. Memory can include nonvolatile (state does not change if power to the memory device is interrupted) and/or volatile (state is indeterminate if power to the memory device is interrupted) memory devices. Memory 660 can store application data, user data, music, photos, documents, or other data, as well as system data (whether long-term or temporary) related to the execution of the applications and functions of system 600. Memory 660 further stores firmware images related to boot path operations, and thus may include DRAM devices to store said firmware images as described above.

Connectivity 670 includes hardware devices (e.g., wireless and/or wired connectors and communication hardware) and software components (e.g., drivers, protocol stacks) to enable device 600 to communicate with external devices. The device could be separate devices, such as other computing devices, wireless access points or base stations, as well as peripherals such as headsets, printers, or other devices.

Connectivity 670 can include multiple different types of connectivity. To generalize, device 600 is illustrated with cellular connectivity 672 and wireless connectivity 674. Cellular connectivity 672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity 674 refers to wireless connectivity that is not cellular, and can include personal area networks (such as Bluetooth), local area networks (such as Wi-Fi), and/or wide area networks (such as Wi-Max), or other wireless communication.

Peripheral connections 680 include hardware interfaces and connectors for implementing non-flash firmware storage support as described above, as well as software components (e.g., drivers, protocol stacks) to make peripheral connections. It will be understood that device 600 could both be a peripheral device ("to" 682) to other computing devices, as well as have peripheral devices ("from" 684) connected to it. Device 600 commonly has a "docking" connector to connect to other computing devices for purposes such as managing (e.g., downloading and/or uploading, changing, synchronizing) content on device 600. Additionally, a docking connector can allow device 600 to connect to certain peripherals that allow device 600 to control content output, for example, to audiovisual or other systems.

Logic 690 may comprise software logic, firmware logic, hardware logic, or a combination of two or more types of logic. In this embodiment, said logic is to at least execute any combination of the image, gesture, projector calibration and camera calibration operations discussed above.

In addition to a proprietary docking connector or other proprietary connection hardware, device 600 can make peripheral connections 680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

Various components referred to above as processes, servers, or tools described herein may be a means for performing the functions described. Each component described herein includes software or hardware, or a combination of these. Each and all components may be implemented as logic such as software modules, hardware modules, special-purpose hardware (e.g., application specific hardware, ASICs, DSPs, etc.), embedded controllers, hardwired circuitry, hardware logic, etc. Software content (e.g., data, instructions, configuration) may be provided via an article of manufacture including a non-transitory, tangible computer or machine readable storage medium, which provides content that represents instructions that can be executed. The content may result in a computer performing various functions/operations described herein.

A computer readable non-transitory storage medium includes any mechanism that provides (i.e., stores and/or transmits) information in a form accessible by a computer (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer readable non-transitory storage medium may also include a storage or database from which content can be downloaded. Said computer readable medium may also include a device or product having content stored thereon at a time of sale or delivery. Thus, delivering a device with stored content, or offering content for download over a communication medium may be understood as providing an article of manufacture with such content described herein.

Thus, embodiments of the invention describe an article of manufacture comprising a computer-readable non-transitory storage medium having instructions stored thereon to cause a processor to perform one or more operations. These operations may include: capturing, via an image sensor included in a projector device, image data of an area around the projector device, selecting a projection area within the area around the computing device based, at least in part, on surface properties of the projection area determined from the image data of the area around the projector device, projecting a user input/output (I/O) display onto the selected projection area around the projector device, capturing, via the image sensor included in the projector device, image data of the projected user I/O display, configuring the projection of the user I/O display based, at least in part, on the image data of the projected user I/O display, identifying user gestures from the image data of the projected user I/O display, and processing the user gestures as user I/O commands.

In some embodiments, said operations further include receiving, via an ambient light sensor (ALS) included in the projector device, data identifying an ambient light level for the selected projection area, and configuring a brightness of the projection of the user I/O display further based, at least in part, on the ambient light level for the selected projection area.

In some embodiments, said surface properties of the selected projection area include color properties of the selected projection area, and said operations further include configuring the projection of the user I/O display further based, at least in part, the color properties of the selected projection area determined from the image data of the area around the projector device. Said operations may further include detecting an incline angle of the projector with respect to the selected projection area, and configuring the projection of the user I/O display to correct for keystone distortion further based, at least in part, on the detected incline angle of the projector with respect to the selected projection area.

In some embodiments, said operations may further include identifying, from the image data, a first user, and configuring the projection of the user I/O display to be oriented with respect to the first user. Furthermore, embodiments of the invention may include operations for identifying a second user from the image data, and capturing gestures of the second user within the I/O display via the image sensor included in the projector device.

Embodiments of the invention may describe system comprising a projector to project a user input/output (I/O) display onto a projection area and an image sensor to capture the image data of an area around the apparatus, to capture image data of the projected user I/O display, and to capture image data of user gestures within a viewable frame of the I/O display via the image sensor. These systems may include a plurality of logic components, including an image processing logic to select the projection area based, at least in part, on surface properties of the projection area determined from the image data of the area around the projector, a gesture processing logic to process the user gestures as user I/O commands, and a projector calibration logic to calibrate the projector based, at least in part, on the image data of an area around the apparatus and the captured image data of the projected user I/O display. These systems may also include an antenna, and radio frequency circuitry coupled to the antenna to receive signal data to be processed by the system.

In some embodiments, the projector, the camera, the antenna and the radio frequency circuitry are included in a projector device, and the image processing logic, the gesture processing logic and the projector calibration logic are included in a computing device communicatively coupled to the projector device via the antenna. In other embodiments, systems may include all components in a single device further including a memory including the image processing logic and the gesture processing logic, and a processor to execute the image processing logic, the gesture processing logic and the projector calibration logic.

In some embodiments, these systems further include an ambient light sensor (ALS) to capture data identifying an ambient light level for the projection area; wherein the projector calibration logic to further configure one or more brightness parameters of the projector based, at least in part, on the ambient light level for the selected projection area. Said projector calibration logic may further configure the projector based, at least in part, color properties of the selected projection area determined from the image data of the area around the projector. Said projector calibration logic may also detect an incline angle of the projector with respect to the projection area, and configure the projection of the user I/O display to correct for keystone distortion based, at least in part, on the detected incline angle of the projector with respect to the projection area.

Embodiments of the invention describe apparatuses having a projector to project a user input/output (I/O) display onto a projection area, the projection area selected based, at least in part, on surface properties of the projection area determined from an image data of the area around the apparatus, and an image sensor to capture the image data of an area around the apparatus, to capture image data of the projected user I/O display, and to capture image data of user gestures within a viewable frame of the I/O display via the image sensor. Said apparatuses further include a plurality of logic components, including a projector calibration logic to calibrate the projector based, at least in part, on the captured image data of the projected user I/O display and the image data of an area around the apparatus, and a gesture processing logic to process the user gestures as user I/O commands.

In some embodiments, said apparatuses include an ambient light sensor (ALS) to capture data identifying an ambient light level for the projection area; wherein the projector calibration logic to further configure one or more brightness parameters of the projector based, at least in part, on the ambient light level for the selected projection area.

In some embodiments, said projector calibration logic may further configure the projector based, at least in part, color properties of the selected projection area determined from the image data of the area around the apparatus. Said projector calibration logic may also detect an incline angle of the projector with respect to the projection area, and configure the projection of the user I/O display to correct for keystone distortion based, at least in part, on the detected incline angle of the projector with respect to the projection area.

In some embodiments, an apparatus further comprises an attachment member to couple the apparatus to a surface opposing the projection surface. In other embodiments, an apparatus may further comprise a housing including the projector and the image sensor, and a stand coupled to the housing.

The invention claimed is:

1. An apparatus comprising:
a projector to project a user input/output (I/O) interface onto a surface, the surface selected by the apparatus as a projection area for the user I/O interface based, at least in part, on properties of the surface determined from an image data of an area around the apparatus, the properties of the surface including one or more of color properties and texture properties of the selected surface;
an image sensor to capture the image data of the area around the apparatus, to capture image data of the projected user I/O interface, and to capture image data of user gestures including touch-based user gestures on the selected surface of the projected user I/O interface via the image sensor, wherein capturing image data by the image sensor includes capturing three-dimensional distance information for detection of the user gestures;
a projector calibration logic to calibrate the projector based, at least in part, on the captured image data of the projected user I/O interface and the image data of the area around the apparatus; and
a gesture processing logic to process the user gestures as user I/O commands to interact with the projected user I/O interface;
wherein the projector calibration logic is to re-calibrate the projector upon the apparatus determining that the properties of the surface selected as the projection area for the user I/O interface have changed based on changes to the image data of the area around the apparatus.

2. The apparatus of claim 1, further comprising:
an ambient light sensor (ALS) to capture data identifying an ambient light level for the surface selected as the projection area for the projected user I/O interface;
wherein the projector calibration logic to further configure one or more brightness parameters of the projector based, at least in part, on the ambient light level for the selected surface.

3. The apparatus of claim 1, wherein the projector calibration logic to further:
detect an incline angle of the projector with respect to the surface selected as the projection area for the projected user I/O interface; and
configure the projection of the user I/O interface to correct for keystone distortion based, at least in part, on the detected incline angle of the projector with respect to the selected surface.

4. The apparatus of claim 1, further comprising:
an attachment member to couple the apparatus to a surface opposing the surface selected as the projection area for the user I/O interface.

5. The apparatus of claim 1, further comprising:
a housing including the projector and the image sensor; and
a stand coupled to the housing.

6. A system comprising:
a projector to project a user input/output (I/O) interface onto a surface selected as a projection area;
an image sensor to capture the image data of an area around the apparatus, to capture image data of the projected user I/O interface, and to capture image data of user gestures including touch-based user gestures on the selected surface of the projected user I/O interface via the image sensor, wherein capturing image data by the image sensor includes capturing three-dimensional distance information for detection of the user gestures;
an image processing logic to select the surface for the projection area for the user I/O interface based, at least in part, on properties of the surface determined from the image data of the area around the projector, the properties including one or more of color properties and texture properties of the selected surface;
a gesture processing logic to process the user gestures as user I/O commands to interact with the projected user I/O interface;
a projector calibration logic to calibrate the projector based, at least in part, on the image data of the area around the projector and the captured image data of the projected user I/O interface;
an antenna; and
radio frequency circuitry coupled to the antenna to receive signal data to be processed by the system;
wherein the projector calibration logic is to re-calibrate the projector upon the apparatus determining that the properties of the surface selected as the projection area for the user I/O interface have changed based on changes to the image data of the area around the projector.

7. The system of claim 6, wherein the projector, the camera, the antenna and the radio frequency circuitry are included in a projector device, and the image processing logic, the gesture processing logic and the projector calibration logic are included in a computing device communicatively coupled to the projector device via the antenna.

8. The system of claim 6, further comprising:
a memory including the image processing logic and the gesture processing logic; and
a processor to execute the image processing logic, the gesture processing logic and the projector calibration logic.

9. The system of claim 6, further comprising:
an ambient light sensor (ALS) to capture data identifying an ambient light level for the surface selected as the projection area for the projected user I/O interface;
wherein the projector calibration logic to further configure one or more brightness parameters of the projector based, at least in part, on the ambient light level for the selected surface.

10. The system of claim 6, wherein the projector calibration logic to further:
detect an incline angle of the projector with respect to the surface selected as the projection area for the projected user I/O interface; and
configure the projection of the user I/O interface to correct for keystone distortion based, at least in part, on the detected incline angle of the projector with respect to the selected surface.

11. An article of manufacture comprising a computer-readable non-transitory storage medium having instructions stored thereon to cause a processor to perform operations including:
capturing, via an image sensor included in a projector device, image data of an area around the projector device, wherein capturing image data by the image sensor includes capturing three-dimensional distance information for detection of user gestures;
selecting a surface within the area around the computing device for a projection area for projection of a user input/output (I/O) interface based, at least in part, on properties of the surface determined from the image data of the area around the projector device, the properties including one or more of color properties and texture properties of the selected surface;
projecting the user I/O interface onto the selected surface around the projector device;
capturing, via the image sensor included in the projector device, image data of the projected user I/O interface;
configuring the projection of the user I/O interface based, at least in part, on the image data of the projected user I/O interface;
identifying user gestures including touch-based user gestures on the selected surface from the captured image data of the projected user I/O interface; and
processing the user gestures as user I/O commands to interact with the projected user I/O interface;
wherein the projector calibration logic is to re-configure the projection of the user I/O interface upon determining that the properties of the surface selected as the projection area for the user I/O interface have changed based on changes to the image data of the area around the projector device.

12. The article of manufacture of claim 11, the operations further including:
receiving, via an ambient light sensor (ALS) included in the projector device, data identifying an ambient light level for the surface selected as the projection area for the projected user interface; and
configuring a brightness of the projection of the projected user I/O interface further based, at least in part, on the ambient light level for the selected surface.

13. The article of manufacture of claim 11, the operations further including:
detecting an incline angle of the projector with respect to the surface selected as the projection area for the projected user I/O interface; and
configuring the projection of the user I/O interface to correct for keystone distortion further based, at least in part, on the detected incline angle of the projector with respect to the selected surface.

14. The article of manufacture of claim 11, the operations further including:
identifying, from the image data, a first user at a first location in relation to the projected user I/O interface;
configuring the projection of the user I/O interface to be oriented with respect to the first user; and
re-configuring the projection of the user I/O interface with respect to the first user upon determining that the first user has moved from the first location to a second location in relation to the projected user I/O interface.

15. The article of manufacture of claim 14, the operations further including:
   identifying a second user from the image data; and
   capturing gestures of the second user within the projected user I/O interface via the image sensor included in the projector device.

16. The apparatus of claim 1, wherein the apparatus is to determine whether the properties of the surface selected as the projection area of the projected user I/O interface have changed upon a triggering event.

17. The apparatus of claim 16, wherein the triggering event is a detection of a movement of the apparatus.

18. The apparatus of claim 1, wherein the apparatus is further to:
   identify, from the image data, a first user at a first location in relation to the projected user I/O interface;
   configure the projection of the user I/O interface to be oriented with respect to the first user; and
   re-configuring the projection of the user I/O interface with respect to the first user upon determining that the first user has moved from the first location to a second location in relation to the projected user I/O interface.

* * * * *